US012771260B2

(12) United States Patent
Huang et al.

(10) Patent No.: US 12,771,260 B2
(45) Date of Patent: Oct. 20, 2026

(54) CONTROLLERS FOR SYNCHRONOUS RECTIFICATION AND CONTROL METHODS THEREOF

(71) Applicant: Leadtrend Technology Corporation, Zhubei (TW)

(72) Inventors: Jun-Hao Huang, Zhubei (TW); Tsung-Chien Wu, Zhubei (TW); Ming-Chang Tsou, Zhubei (TW); Chun-Hsin Li, Zhubei (TW)

(73) Assignee: LEADTREND TECHNOLOGY CORPORATION, Zhubei City (TW)

( * ) Notice: Subject to any disclaimer, the term of this patent is extended or adjusted under 35 U.S.C. 154(b) by 119 days.

(21) Appl. No.: 18/976,608

(22) Filed: Dec. 11, 2024

(65) Prior Publication Data

US 2026/0025079 A1 Jan. 22, 2026

(30) Foreign Application Priority Data

Jul. 19, 2024 (TW) ................................ 113127220

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ............................ H02M 2/33592; H02M 1/08
USPC ....................................................... 363/21.06
See application file for complete search history.

(56) References Cited

U.S. PATENT DOCUMENTS

2023/0058506 A1* 2/2023 Liu .................. H02M 3/33592

* cited by examiner

*Primary Examiner* — Tomi Skibinski
(74) *Attorney, Agent, or Firm* — McClure, Qualey & Rodack, LLP

(57) ABSTRACT

A synchronous rectification controller controls a synchronous rectifier with a control node and a detection node. The synchronous rectification controller comprises an ON-time recorder and a differential driver. The ON-time recorder records a previous ON-time in response to a detected voltage at the detection node, and determines first and second regulation periods in an ON time of the synchronous rectifier based on the previous ON-time. The first regulation period occurs prior to the second regulation period. The differential driver drives the control node to regulate the detected voltage to first and second target voltages during the first and second regulation periods, respectively. The first and second target voltages are different from each other.

20 Claims, 6 Drawing Sheets

CONTROLLERS FOR SYNCHRONOUS RECTIFICATION AND CONTROL METHODS THEREOF

CROSS-REFERENCE TO RELATED APPLICATION

This application claims priority to and the benefit of Taiwan Application Series Number 113127220 filed on Jul. 19, 2024, which is incorporated by reference in its entirety.

BACKGROUND

The present disclosure relates generally to LLC converters with synchronous rectification, and more particularly to LCC converters and control methods that regulate a detected voltage at a detection node of a synchronous rectifier.

LLC converters are one type of resonant converters, which typically provides a stable output voltage, high conversion efficiency, and high output power. Generally, a resonant converter converts a DC input power source into a sinusoidal signal, and this conversion can be achieved through a switch network that supplies a square-wave voltage to a resonant tank. After filtering through the resonant tank, the fundamental component of the square-wave voltage is predominantly retained, roughly producing a sinusoidal input current. Due to the inductive effects, an AC current is generated on the secondary side of the LLC converter, and, after rectification, it can be used to establish an output power source.

LLC converters are typically used for high-power application. To improve conversion efficiency, synchronous rectification can be employed on the secondary side of an LLC converter. This involves replacing the traditionally-used rectifier diode with a power switch and a synchronous rectification controller controlling the power switch. The power switch is normally named a synchronous rectifier. Doing so can reduce or eliminate the significant power loss caused by the forward voltage of the rectifier diode when conducting large currents.

Although synchronous rectification improves conversion efficiency, it can also introduce issues that require special handling. Specially, significant current variations can amplify the effects of parasitic inductance, potentially leading erroneous detection or operation.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
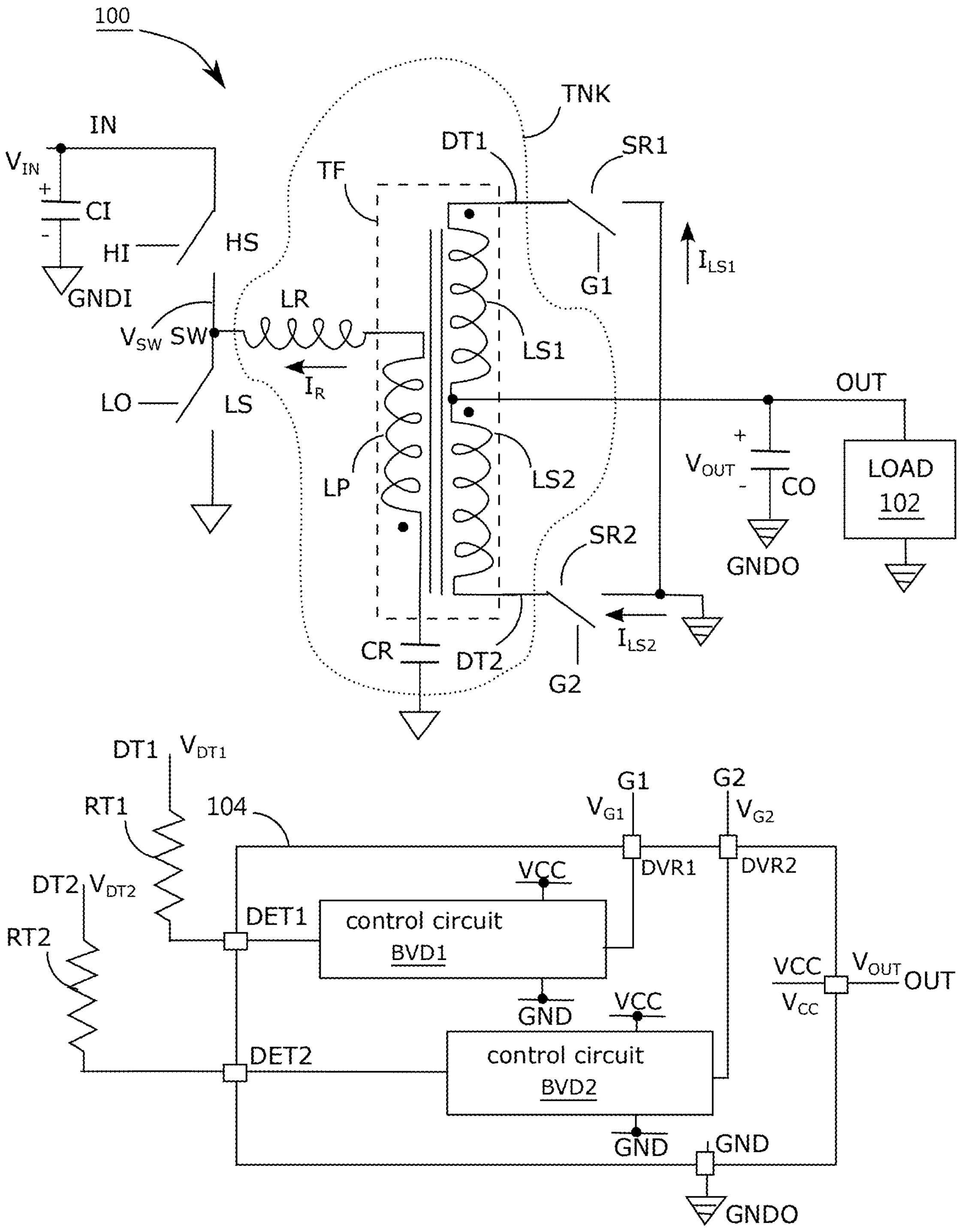
FIG. 1 illustrates an LLC converter according to an embodiment of the invention.

FIG. 1 illustrates LLC converter 100, which converts input power source $V_{IN}$ on the primary side into output power source $V_{OUT}$ on the secondary side. On the secondary side, LLC converter 100 utilizes synchronous rectification with two synchronous rectifiers SR1 and SR2, to rectify inductor currents $I_{LS1}$ and $I_{LS2}$ from secondary windings LS1 and LS2, respectively.

On the primary side, high-side switch HS and low-side switch are connected in series between input power line IN and input ground line GNDI, forming a half-bridge structure that functions as a square-wave generator. Filter capacitor CI, connected between input power line IN and input ground line GNDI, substantially stabilizes the voltage of input power source $V_{IN}$. High-side switch HS and low-side switch LS are controlled by signals HI and LO, respectively.

Resonant inductor LR, primary winding LP of transformer TF, and resonant capacitor CR are connected in series between input node SW and input ground line GNDI, forming LLC resonant tank TNK. In one embodiment, resonant inductor LR may not be a discrete component but instead the leakage inductance of primary winding LP that is not inductively coupled with secondary windings LS1 and LS2.

High-side switch HS and low-side switch LS are alternately turned on, providing a square-wave voltage to input node SW, causing LLC resonant tank TNK to resonate. An alternating current $I_R$ is generated on resonant inductor LR. Through the inductively coupling of transformer TF, corresponding inductor currents $I_{LS1}$ and $I_{LS2}$ are generated on secondary windings LS1 and LS2, respectively. Synchronous rectifiers SR1 and SR2, two power switches, provide full-wave rectification to inductor currents $I_{LS1}$ and $I_{LS2}$, where synchronous rectifiers SR1 is between output ground line GNDO and detection node DT1, and synchronous rectifiers SR2 between output ground line GNDO and detection node DT2. Filter capacitor CO provides low-pass filtering to stabilize output power source $V_{OUT}$ between output power line OUT and output ground line GNDO. Output power source $V_{OUT}$ supplies power to load 102. In FIG. 1, output power source $V_{OUT}$ also functions to supply power to synchronous rectification controller 104, which controls synchronous rectifiers SR1 and SR2. The voltage at output ground line GNDO is deemed as 0V, a ground reference voltage for all voltages on the secondary side.

Resistors RT1 and RT2 connect synchronous rectification controller 104 to detection nodes DT1 and DT2, respectively. Based on detected voltage $V_{DT1}$ and $V_{DT2}$, synchronous rectification controller 104 drives control nodes G1 and G2 of synchronous rectifiers SR1 and SR2. For instance, in response to detected voltage $V_{DT1}$, control circuit BVD1 in synchronous rectification controller 104 generates control signal $V_{G1}$ to appropriately control synchronous rectifiers SR1.

Figure 2:
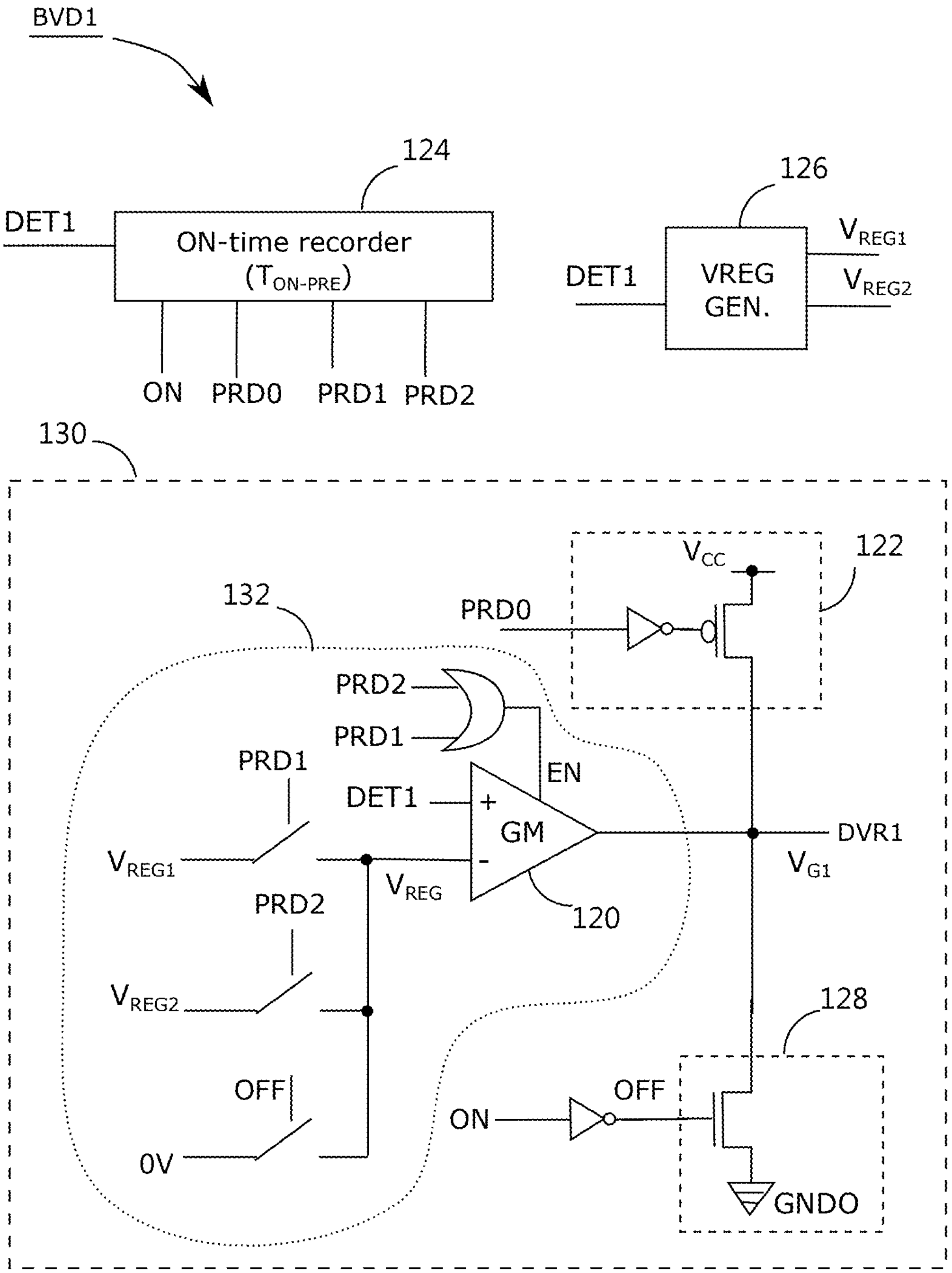
FIG. 2 demonstrates a control circuit according to embodiments of the invention.

FIG. 2 demonstrates control circuit BVD1. Control circuit BVD2 could be inferred from control circuit BVD1 and might not be detailed hereinafter. As shown in FIG. 2, control circuit BVD1 includes ON-time recorder 124, target-voltage generator 126, and driver 130. ON-time recorder 124 records previous ON-time $T_{ON\text{-}PRE}$, which will be explained later. In response to detected voltage $V_{DT1}$ at detection node DET1, target-voltage generator 126 provides target voltages $V_{REG1}$ and $V_{REG2}$ to differential amplifier 132, which accordingly generates control signal $V_{G1}$ at control node G1.

Figure 3:
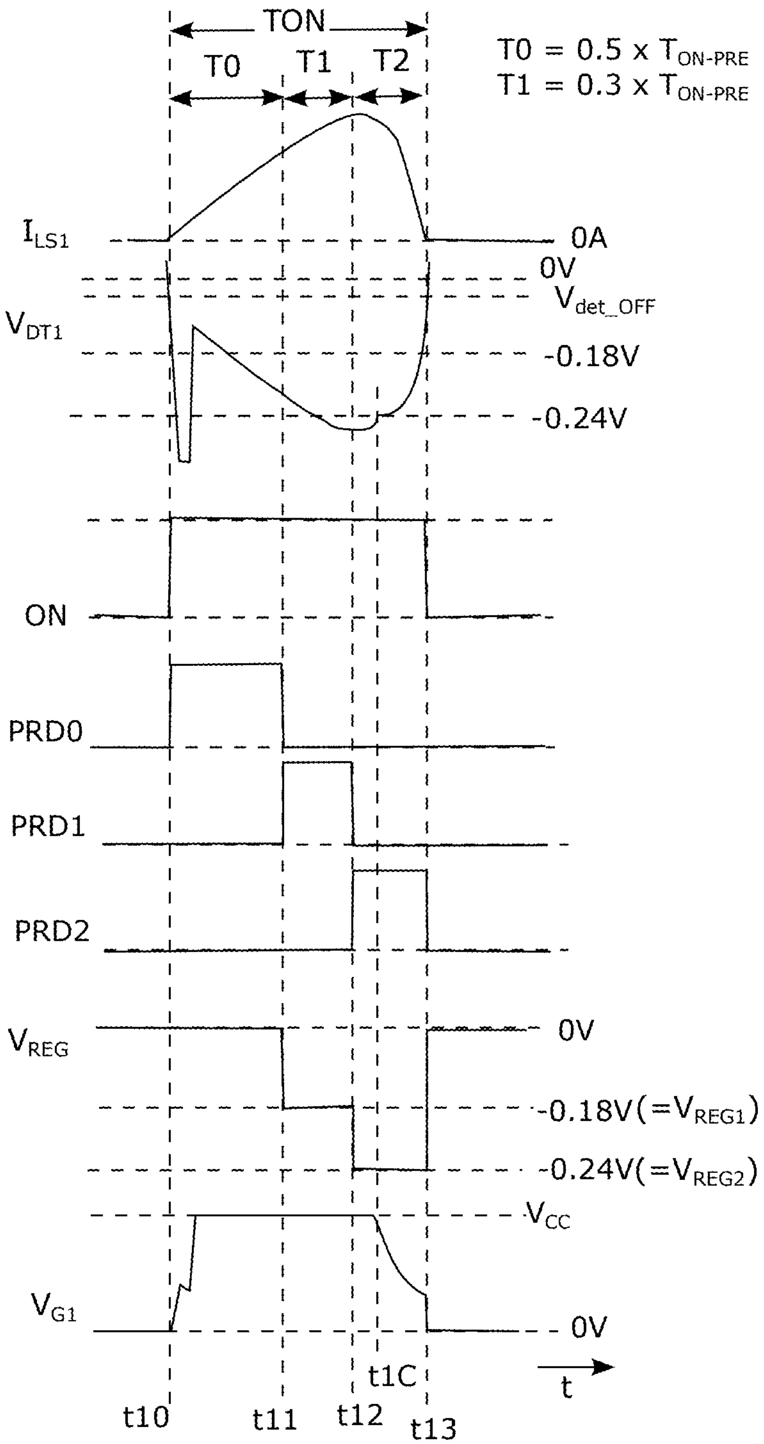
FIG. 3 shows the waveforms of inductor current $I_{LS1}$ passing through synchronous rectifier SR1, detected voltage $V_{DT1}$ at detection node DT1, variations in certain logic values from FIG. 2, and the waveform of control signal $V_{G1}$ at control node G1.

FIG. 3 shows the waveforms of inductor current $I_{LS1}$ passing through synchronous rectifier SR1, detected voltage $V_{DT1}$ at detection node DT1, logic changes of some signals in FIG. 2, and the waveform of control signal $V_{G1}$ at control node G1.

Before moment t10 in FIG. 3, synchronous rectifier SR1 is at an OFF state, signal ON is "0", control signal $V_{G1}$ is 0V, detected voltage $V_{DT1}$ is positive, and inductor current $I_{LS1}$ is 0 A, with no inverse current or leakage current present.

From moment t10 to moment t13 in FIG. 3, due to the resonance of LLC resonant tank TNK, inductor current $I_{LS1}$ is positive, and detected voltage $V_{DT1}$ is negative. During this period, referred as ON time TON of synchronous rectifier SR1, synchronous rectifier SR1 should be turned ON to reduce the resistance in the current path, allowing inductor current $I_{LS1}$ to flow efficiently through synchronous rectifier SR1.

ON-time recorder 124 in FIG. 2 determines the beginning and end of ON time TON based on detected voltage $V_{DT1}$. For example, by comparing detected voltage $V_{DT1}$ with reference voltage $V_{det\_OFF}$, such as −0.1V, signal ON transitions to logic "1" to indicate the beginning of ON time TON when detected voltage $V_{DT1}$ drops below reference voltage $V_{det\_OFF}$, as shown at moment t01 in FIG. 3. Conversely, ON-time recorder 124 makes signal ON transition to logic "0" to indicate the end of ON time TON if detected voltage $V_{DT1}$ rises above reference voltage $V_{det\_OFF}$, as demonstrated at moment t13 in FIG. 3.

During ON time TON, ON-time recorder 124 in FIG. 2 records previous ON-time $T_{ON\text{-}PRE}$, which represents the duration of ON time TON in the prior switching cycle. At moment t13 when ON time TON ends, ON-time recorder 124 updates previous ON-time $T_{ON\text{-}PRE}$ with the duration of ON time TON.

Based on previous ON-time $T_{ON\text{-}PRE}$, ON-time recorder 124 divides ON time TON into fully-ON period TO, and regulation periods T1 and T2, corresponding to pulses PRD0, PRD1 and PRD2 respectively, as shown in FIG. 3. As illustrated in FIG. 3, ON-time recorder 124 starts fully-ON period T0 simultaneously with the beginning of ON time TON, and ends fully-ON period T0 when its duration equals half of previous ON-time $T_{ON\text{-}PRE}$. Regulation period T1 follows fully-ON period TO, and ends when its duration equals about three-tenths of previous ON-time $T_{ON\text{-}PRE}$. Regulation period T2 follows regulation period T1, and ends when ON time TON concludes. Accordingly, in a steady state, the duration of ON time TON should not change over time, the same as previous ON-time $T_{ON\text{-}PRE}$, so regulation period T2 is expected to last two-tenths of previous ON-time $T_{ON\text{-}PRE}$. Therefore, regulation periods T1 and T2 are in association with previous ON-time $T_{ON\text{-}PRE}$. Specially, as shown in FIG. 3, regulation period T1 starts when ON time TON reaches 50% of previous ON-time $T_{ON\text{-}PRE}$, and regulation period T2 begins when ON time TON reaches 80% of previous ON-time $T_{ON\text{-}PRE}$.

Drivers 130 controls control node G1 using different methods for fully-ON period T0 and regulation periods T1 and T2. Driver 130 in FIG. 2 includes shutdown driver 128, fully-ON driver 122, and differential driver 132. Shutdown driver 128 keeps control signal $V_{G1}$ at 0V to turn OFF synchronous rectifier SR1 and prevent the occurrence of reverse current outside ON time TON. During fully-ON period T0 represented by pulse PRD0, fully-ON driver 122 forcefully pulls control signal VG1 up to a predefined voltage, such as the voltage of operation power source $V_{CC}$ or the maximum voltage that synchronous rectifier SR1 can sustain, to minimize the ON resistance of synchronous rectifier SR1 as much as possible. During regulation period T1, transconductor 120 in differential driver 132 is enabled to compare detected voltage $V_{DT1}$ to target voltage $V_{REG1}$. In this period, transconductor 120 is configured to regulate detected voltage $V_{DT1}$ to approach target voltage $V_{REG1}$. Similarly, during regulation period T2, transconductor 120 is configured to regulate detected voltage $V_{DT1}$ to approach target voltage $V_{REG2}$. In the embodiment shown in FIG. 3, target voltages $V_{REG1}$ and $V_{REG2}$ are −0.18V and −0.24V, respectively, and they appear as target signal $V_{REG}$ at one input terminal of transconductor 120 during regulation periods T1 and T2.

FIG. 3 illustrates that control signal $V_{G1}$ rises to operation power source $V_{cc}$ during fully-ON period TO. During regulation period T1, control signal $V_{G1}$ remains at operation power source $V_{CC}$ because detected voltage $V_{DT1}$ remains constantly below target voltage $V_{REG1}$, −0.18V. As a result, transconductor 120 does not pull control signal $V_{G1}$ down during this period. Within regulation period T2, after crossing moment t1C and before moment t13, detected voltage $V_{DT1}$ exceeds target voltage $V_{REG2}$, −0.24V. In response, transconductor 120 pulls down control signal $V_{G1}$, attempting to bring detected voltage $V_{DT1}$ close to −0.24V.

Target-voltage generator 126 in FIG. 2 generates target voltages $V_{REG1}$ and $V_{REG2}$, respectively, based on detected voltage $V_{DT1}$. In one embodiment, target voltages $V_{REG1}$ and $V_{REG2}$ are set to be −0.18V and −0.24V, respectively, when previous ON-time $T_{ON\text{-}PRE}$ has a specific duration. However, if previous ON-time $T_{ON\text{-}PRE}$ has a shorter duration, target voltages $V_{REG1}$ and $V_{REG2}$ are adjusted to −0.14V and −0.20V, respectively. According to some embodiments of the invention, target voltages $V_{REG1}$ and $V_{REG2}$ are determined in response to the minimum value of detected voltage $V_{DT1}$ or the voltage of output power source $V_{OUT}$.

Figure 4:
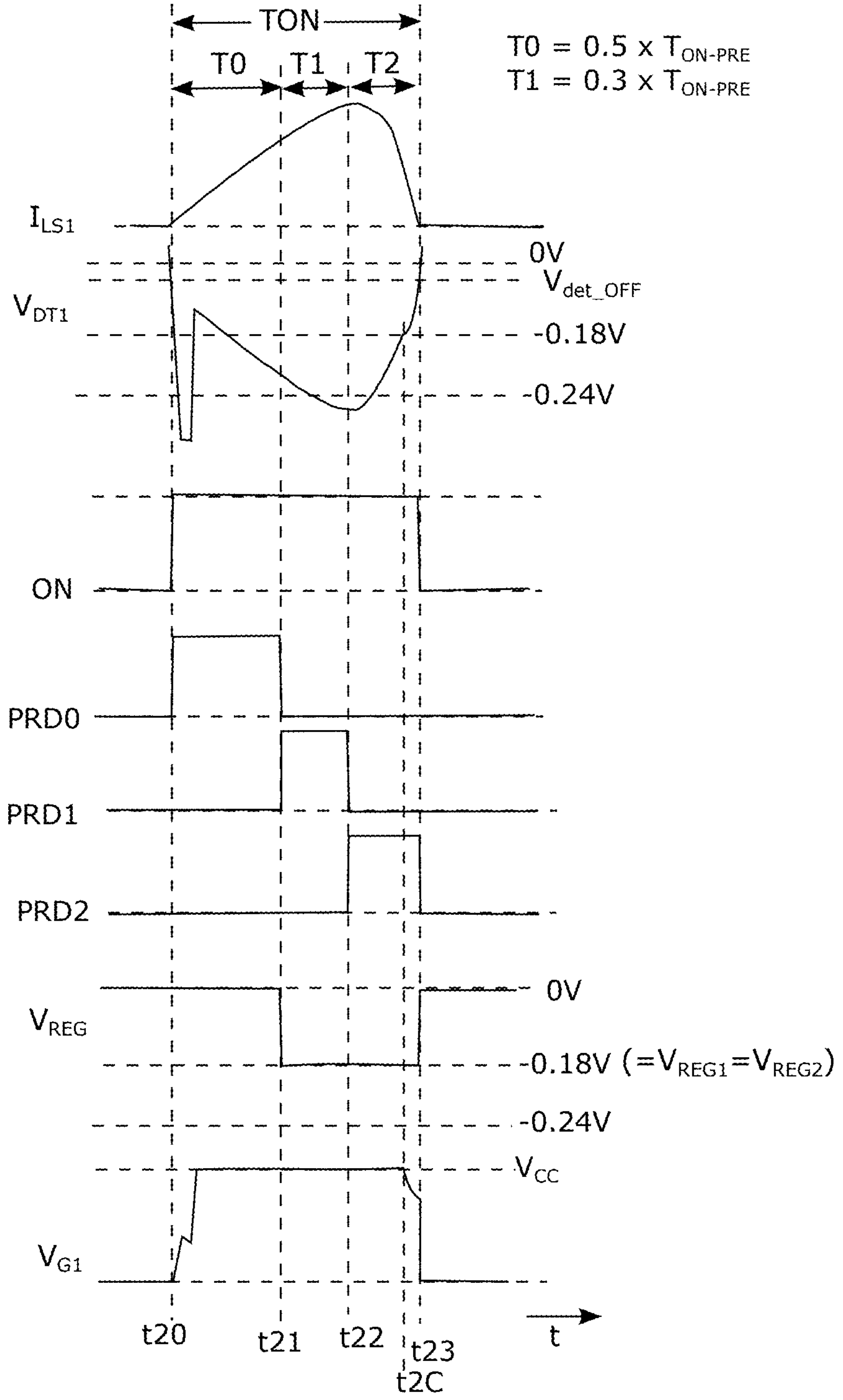
FIG. 4 shows the waveforms of the same signals shown in FIG. 3 when both target voltages $V_{REG1}$ and $V_{REG2}$ are set to be −0.18V.

Target voltage $V_{REG1}$ and $V_{REG2}$ are set to be −0.18V and −0.24V in FIG. 3, respectively. FIG. 4 is similar with FIG. 3, but the embodiment for FIG. 4 has both target voltage $V_{REG1}$ and $V_{REG2}$ set to be −0.18V, however. As shown in FIG. 4, within regulation period T2, after crossing moment t2C and before moment t23, detected voltage $V_{DT1}$ exceeds −0.18V and control signal $V_{G1}$ deceases to bring detected voltage $V_{DT1}$ closer to −0.18V. If moment t20 of FIG. 4 aligns with moment t10 of FIG. 3, moment t2*c* occurs behind moment t1*c*.

Figure 5:
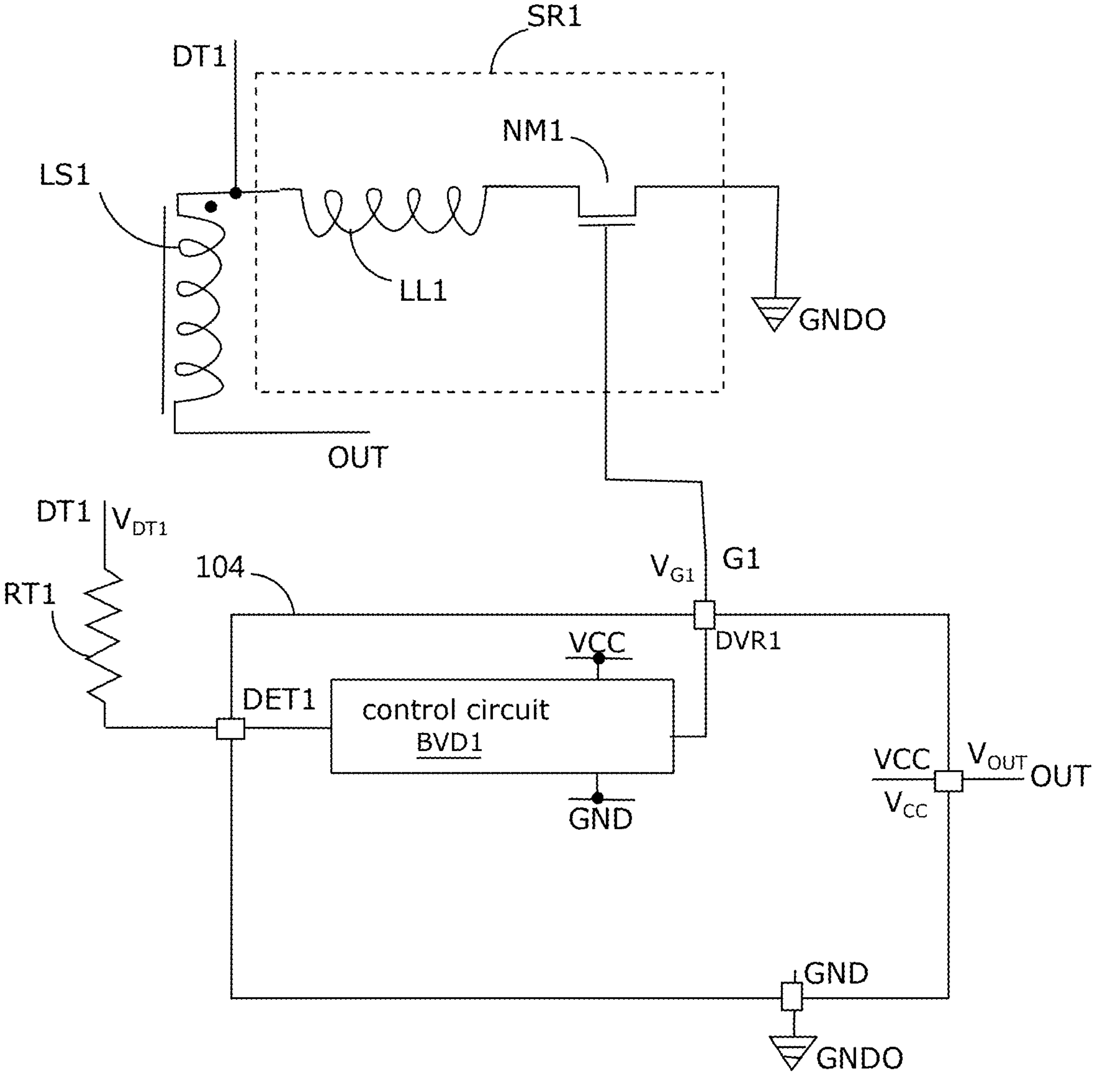
FIG. 5 illustrates a synchronous rectifier and related components.

When inductor current $I_{LS1}$ is high, parasitic inductance associated with the package pins of synchronous rectifier SR1 can significantly impact its operation. FIG. 5 illustrates synchronous rectifier SR1 and related components. In FIG. 5, synchronous rectifier SR1 includes NMOS transistor NM1 and parasitic inductor LL1, which represents the inductance of the package pins connected in series with the drain or source electrode of NMOS transistor NM1. When high-side switch HS and low-side switch LS are switched ON or OFF rapidly, the presence of parasitic inductor LL1 can cause substantial fluctuations in detected voltage $V_{DT1}$.

Figure 6:
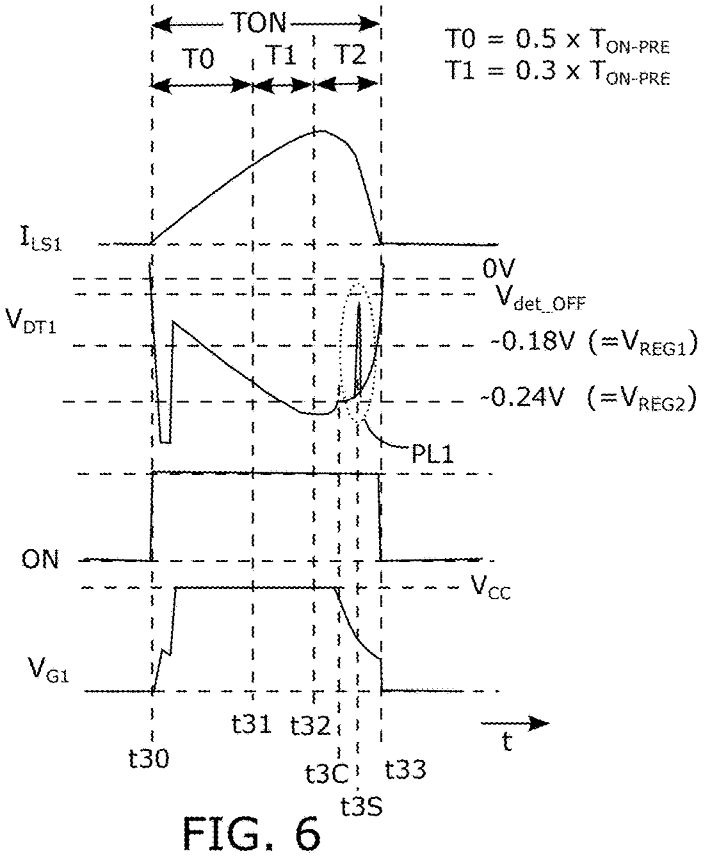
FIGS. 6 and 7 redraw the waveforms of inductor current $I_{LS1}$, signal ON, and control signal $V_{G1}$, with adjustments for the possible impact of parasitic inductor LL1 from FIG. 5.
Figure 7:
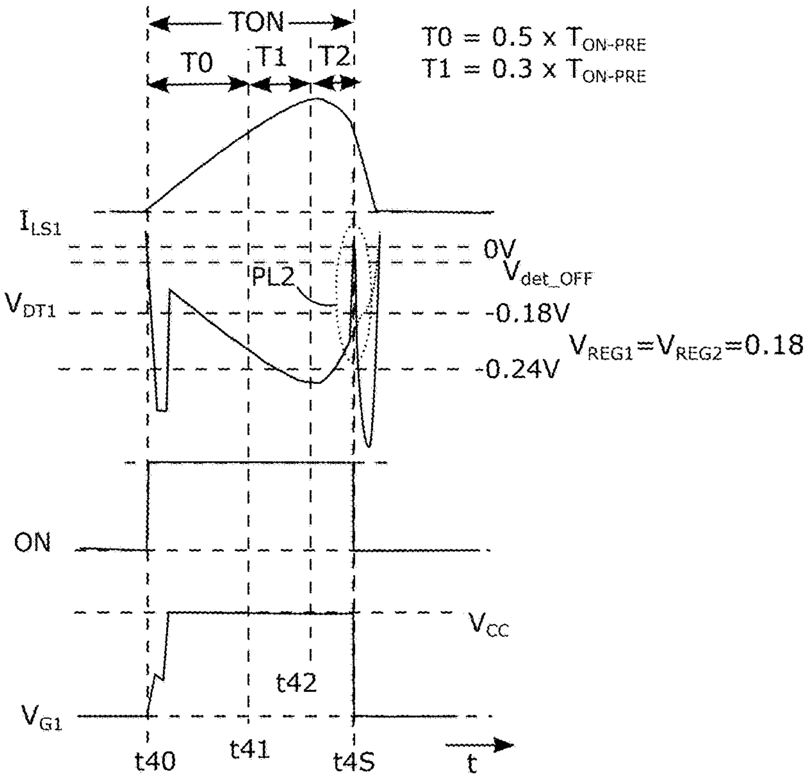

FIGS. 6 and 7 redraw the waveforms of inductor current $I_{LS1}$, detected voltage $V_{DT1}$, signal ON, and control signal $V_{G1}$ that are shown in FIGS. 3 and 4, respectively, with adjustments for the possible impact of parasitic inductor LL1 from FIG. 5. Both switching moment t3S in FIG. 6 and switching moment t4*s* in FIG. 7 represent the same event when one of high-side switch HS and low-side switch LS transitions from ON to OFF. Consequently, the waveforms of detected voltage $V_{DT1}$ in FIGS. 6 and 7 exhibit abrupt pulses PL1 and PL2 at switching moments t3S and t4S respectively, each having approximately the same amplitude due to the inductance of parasitic inductor LL1.

As shown in FIG. 6, abrupt pulses PL1 does not reach reference voltage $V_{det\_OFF}$. Accordingly, ON time TON in FIG. 6 lasts until moment t33, identical to what is depicted in FIG. 3. The durations of ON time TON in FIGS. 6 and 3 remain the same.

Nevertheless, abrupt pulse PL2 reaches reference voltage $V_{det\_OFF}$, causing signal ON to immediately transition into "0" in logic and ending ON time TON at switching moment t4S, as shown in FIG. 7. Compared to FIG. 4, ON time TON in FIG. 7 is significantly shorter, and it ends at the moment when inductor current $I_{LS1}$ is still substantial, resulting in higher conduction loss.

Based on the comparison between FIGS. 6 and 7, control signal $V_{G1}$ in FIG. 6 starts decreasing earlier at crossing moment t3C, so detected voltage $V_{DT1}$ in FIG. 6 right before the occurring of abrupt pulse PL1 has a lower value than detected voltage $V_{DT2}$ in FIG. 7 before abrupt pulse PL2 occurs. Consequently, unlike abrupt pulse PL2 in FIG. 7, which reaches reference voltage $V_{det\_OFF}$, abrupt pulse PL1 in FIG. 6, starting from a lower value, does not reach reference voltage $V_{det\_OFF}$, avoiding the higher conduction loss implied in FIG. 7.

Simply speaking, regulating detected voltage $V_{DT1}$ to −0.18V and −0.24V in regulation periods T1 and T2 respectively helps avoiding the higher conduction loss caused by an earlier-stopped ON time TON in FIG. 7.

In some embodiments of the invention, ON time TON excludes fully-ON period TO, and consists only of regulation periods T1 and T2. In another embodiment, ON time TON includes consecutive regulation periods T1, T2, T3, . . . TN, regulating detected voltage $V_{DT1}$ to target voltages $V_{REG1}$, $V_{REG2}$, $V_{REG3}$, . . . $V_{REGN}$, with N being an integer. All target voltages $V_{REG1}$, $V_{REG2}$, $V_{REG3}$, . . . $V_{REGN}$ are negative, and each target voltage used in an earlier regulation period is always higher than that used in a later regulation period.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronous rectification controller for controlling a synchronous rectifier with a control node and a detection node, comprising;

an ON-time recorder for recording a previous ON-time in response to a detected voltage at the detection node, and determining first and second regulation periods in an ON time of the synchronous rectifier based on the previous ON-time, wherein the first regulation period occurs prior to the second regulation period; and a differential driver driving the control node, for regulating the detected voltage to first and second target voltages during the first and second regulation periods respectively, wherein the first and second target voltages are different from each other.

2. The synchronous rectification controller of claim 1, wherein the synchronous rectifier has a grounded node with a ground reference voltage, and both the first and second target voltages are negative in comparison with the ground reference voltage.

3. The synchronous rectification controller of claim 2, wherein the second target voltage is lower than the first target voltage.

4. The synchronous rectification controller of claim 2, wherein the ON time includes a fully-ON period, and the synchronous rectification controller pulls a control signal at the control node up to a predefined voltage during the fully-ON period.

5. The synchronous rectification controller of claim 4, wherein the first regulation period follows the fully-ON period.

6. The synchronous rectification controller of claim 4, wherein the fully-ON period has a duration equal to a predetermined proportion of the previous ON-time.

7. The synchronous rectification controller of claim 1, wherein the first regulation period has a first duration equal to a first predetermined portion of the previous ON-time, and the second regulation period follows the first regulation period.

8. The synchronous rectification controller of claim 1, wherein the differential driver compares the detected voltage to a target signal to control the control node, and the target signal is the first and second target voltages during the first and second regulation periods respectively.

9. The synchronous rectification controller of claim 1, wherein the ON-time recorder determines an end of the ON time based on the detected voltage to update the previous ON-time.

10. A control method for controlling a synchronous rectifier on a secondary side of an LLC converter, wherein the synchronous rectifier has a control node and a detection node, and the detection node is connected to a secondary winding of a transformer, the control method comprising:

recording a previous ON-time of the synchronous rectifier in response to a detected voltage at the detection node;

turning ON the synchronous rectifier to begin an ON time of the synchronous rectifier;

determining consecutive first and second regulation periods within the ON time based on the previous ON-time; and driving the control node of the synchronous rectifier in response to the detected voltage, wherein the detected voltage is regulated to first and second target voltages during the first and second regulation periods respectively, and the first and second target voltages are different from each other.

11. The control method of claim 10, wherein both the first and second target voltages are negative in comparison with a grounded node of the synchronous rectifier.

12. The control method of claim 10, wherein the second target voltage is lower than the first target voltage.

13. The control method of claim 10, wherein the first regulation period has a first duration equal to a first predetermined portion of the previous ON-time.

14. The control method of claim 10, comprising:

determining a fully-ON period in the ON time in response to the detected voltage and the previous ON-time; and pulling a control signal at the control node up to a predefined voltage during the fully-ON period.

15. The control method of claim 14, wherein the fully-ON period starts simultaneously with the ON time, and has a duration equal to a predetermined proportion of the previous ON-time.

16. An LLC converter with a synchronous rectifier on a secondary side, comprising:

an LLC resonant tank driven by a square-wave generator, comprising a resonant capacitor and a primary winding connected on a primary side of the LLC converter;

a secondary winding inductively coupled to the primary winding, the secondary winding being connected in series with the synchronous rectifier through a detection node between an output power line and an output ground line; and a synchronous rectification controller controlling the synchronous rectifier in response to a detected voltage at the detection node, the synchronous rectification controller comprising:

an ON-time recorder recording a previous ON-time in response to a detected voltage at the detection node, and determining consecutive first and second regulation periods within an ON time of the synchronous rectifier based on the previous ON-time, wherein the first regulation period occurs prior to the second regulation period; and a differential driver driving the control node, for regulating detected voltage to first and second target voltages, wherein the first and second target voltages are different from each other.

17. The LLC converter of claim 16, wherein the second target voltage is lower than the first target voltage.

18. The LLC converter of claim 16, wherein the ON-time recorder determines a fully-ON period within the ON time, and the fully-ON period starts simultaneously with the ON time, having a duration equal to a predetermined proportion of the previous ON-time.

19. The LLC converter of claim 18, wherein the first regulation period follows the fully-ON period.

20. The LLC converter of claim 16, wherein the first regulation period has a first duration equal to a first predetermined portion of the previous ON-time.

* * * * *